(12) United States Patent
Kong et al.

(10) Patent No.: US 12,251,905 B2
(45) Date of Patent: Mar. 18, 2025

(54) GLASS FOR VEHICLES

(71) Applicants: HYUNDAI MOTOR COMPANY, Seoul (KR); KIA CORPORATION, Seoul (KR)

(72) Inventors: Nak Kyoung Kong, Seongnam-si (KR); Jin Hee Lee, Seoul (KR); Gi Heon Jeong, Hwaseong-si (KR); Seung Sik Han, Hwaseong-si (KR); Ki Hong Lee, Seoul (KR); Jong Min Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 305 days.

(21) Appl. No.: 17/519,078

(22) Filed: Nov. 4, 2021

(65) Prior Publication Data

US 2022/0297409 A1   Sep. 22, 2022

(30) Foreign Application Priority Data

Mar. 19, 2021 (KR) .................. 10-2021-0035806

(51) Int. Cl.
*B32B 17/10* (2006.01)
*B32B 3/26* (2006.01)
*B32B 7/023* (2019.01)

(52) U.S. Cl.
CPC ........ *B32B 17/10165* (2013.01); *B32B 3/263* (2013.01); *B32B 7/023* (2019.01); *B32B 17/1055* (2013.01); *B32B 2307/102* (2013.01); *B32B 2307/418* (2013.01); *B32B 2605/006* (2013.01)

(58) Field of Classification Search
CPC ............ B32B 17/10; B32B 7/023; B32B 3/26
USPC ......................................................... 428/156
See application file for complete search history.

(56) References Cited

U.S. PATENT DOCUMENTS

| 2004/0166288 | A1* | 8/2004 | Travis | B32B 17/10036 |
| | | | | 428/156 |
| 2011/0076459 | A1* | 3/2011 | Lu | B32B 27/22 |
| | | | | 428/172 |
| 2014/0085701 | A1* | 3/2014 | Selles | C03C 17/23 |
| | | | | 359/275 |
| 2016/0341960 | A1* | 11/2016 | Miyai | B32B 17/10761 |

FOREIGN PATENT DOCUMENTS

| KR | 10-2002-0021091 A | 3/2002 |
| KR | 10-310022 A | 9/2013 |
| KR | 10-1408392 A | 6/2014 |

* cited by examiner

*Primary Examiner* — Tahseen Khan
(74) *Attorney, Agent, or Firm* — Morgan, Lewis & Bockius LLP

(57) ABSTRACT

Disclosed is a glass for vehicles. The glass for vehicles includes a first glass panel, a second glass panel spaced apart from the first glass panel while maintaining a regular distance from the first glass panel, bonding films located between the first glass panel and the second glass panel, and a high refractive film located between the bonding films. The high refractive film is configured to have a wedge angle of 0.0028 rad to 0.0042 rad in the longitudinal section thereof.

19 Claims, 5 Drawing Sheets

GLASS FOR VEHICLES

CROSS-REFERENCE TO RELATED APPLICATION

This application claims under 35 U.S.C. § 119(a) the benefit of priority to Korean Patent Application No. 10-2021-0035806 filed on Mar. 19, 2021, the entire contents of which are incorporated herein by reference.

TECHNICAL FIELD

The present disclosure relates to a glass for vehicles. More particularly, it relates to an optical structure of a laminated glass on which information from a head-up display is displayed.

BACKGROUND

In general, a head-up display presents vehicle driving information, road guide information and peripheral situation information as long as the information does not deviate from a region in front of a driver, i.e., the main line of sight of the driver, during driving of a vehicle or flight of an airplane.

FIG. 1 is a schematic view illustrating the configuration of a conventional head-up display.

The conventional head-up display includes a multimedia device 1 configured to display an image including vehicle driving information, road guide information, peripheral situation information, etc., an optical path conversion unit 2 configured to continuously convert the path of the image displayed by the multimedia device 1 so as to expand the viewing angle of the image, and a first mirror 3 and a second mirror 4 configured to reflect the image having the viewing angle expanded by the optical path conversion unit 2 onto a windshield glass 5 of a vehicle so as to provide the reflected image to a user. Here, windshield glasses used in conventional head-up displays are roughly classified into a combiner type and a PVB bonded type.

In a combiner-type windshield glass, a coating layer formed of $TiO_2$ is formed on the rear surface (in the direction towards the interior of a vehicle) of an inner glass panel bonded to an outer glass panel, and thus forms an image, provided by a head-up display, thereon and reflects the image to a user's eyes. However, a portion of the image provided by the head-up display is reflected by the coating film and is thus provided to the user, but another portion of the image passes through the coating layer and is thus formed on the rear surface of the inner glass panel. Therefore, the image provided by the head-up display is formed both on the coating film and the rear surface of the inner glass panel, i.e., a double image occurs, and thus, the user is not capable of properly confirming the image provided by the head-up display.

In contrast, in a PVB bonded-type windshield glass, a wedge-shaped PVB film is inserted between an upper glass panel and a lower glass panel so as to form an image, provided by a head-up display, thereon and to refract and reflect the image towards a user. Here, the PVB film is a safety film which is manufactured so as to be firmly adhered to pieces of broken glass, when the windshield glass is broken, and thus to prevent the pieces of broken glass from scattering. That is, in the conventional PVB bonded-type windshield glass, the PVB film is manufactured to have a wedge shape, as seen in the longitudinal section thereof, and the wedge-shaped PVB refracts and reflects the image, displayed by the multimedia device of the head-up display, towards the user's eyes.

Therefore, the PVB bonded-type windshield glass may solve occurrence of a double image, in contrast to the combiner-type windshield glass. However, the PVB bonded-type windshield glass has a problem that the upper glass panel and the lower glass panel have different thicknesses so as to refract and reflect the image, displayed by the head-up display, towards the user's eyes.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide a glass device which includes a first glass panel and a second glass panel having longitudinal-sectional shapes substantially parallel to each other so as to display an image provided by a head-up display.

It is another object of the present disclosure to provide a glass for vehicles into which a high refractive film configured not to form a double image thereon is inserted so as to form an image, provided by a multimedia device of a head-up display, on the glass.

In one aspect, the present disclosure provides a glass for vehicles, including a first glass panel, a second glass panel spaced apart from the first glass panel while maintaining a predetermined distance from the first glass panel, bonding films located between the first glass panel and the second glass panel, and a high refractive film located between the bonding films. The high refractive film is configured to have a wedge angle of 0.0028 rad to 0.0042 rad in a longitudinal section thereof.

In a preferred embodiment, one surface of the first glass panel and one surface of the second glass panel may maintain the same distance therebetween.

In another preferred embodiment, the high refractive film may be configured to have a refractive index of 1.58 to 1.62.

In still another preferred embodiment, the high refractive film may include at least one of ionomer, polyurethane, thermoplastic polyurethane or combinations thereof.

In yet another preferred embodiment, the high refractive film may be configured to be located in at least a portion of a space between the first glass panel and the second glass panel.

In still yet another preferred embodiment, the glass for vehicles may further include a sound insulating film located between the high refractive film and one of the bonding films.

In a further preferred embodiment, the sound insulating film may extend along the first glass panel or the second glass panel.

In another further preferred embodiment, the sound insulating film may be in contact with the high refractive film.

In still another further preferred embodiment, the sound insulating film may be located parallel to an exterior surface of the glass for vehicles.

In yet another further preferred embodiment, the bonding films may include polyvinyl butyral (PVB).

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
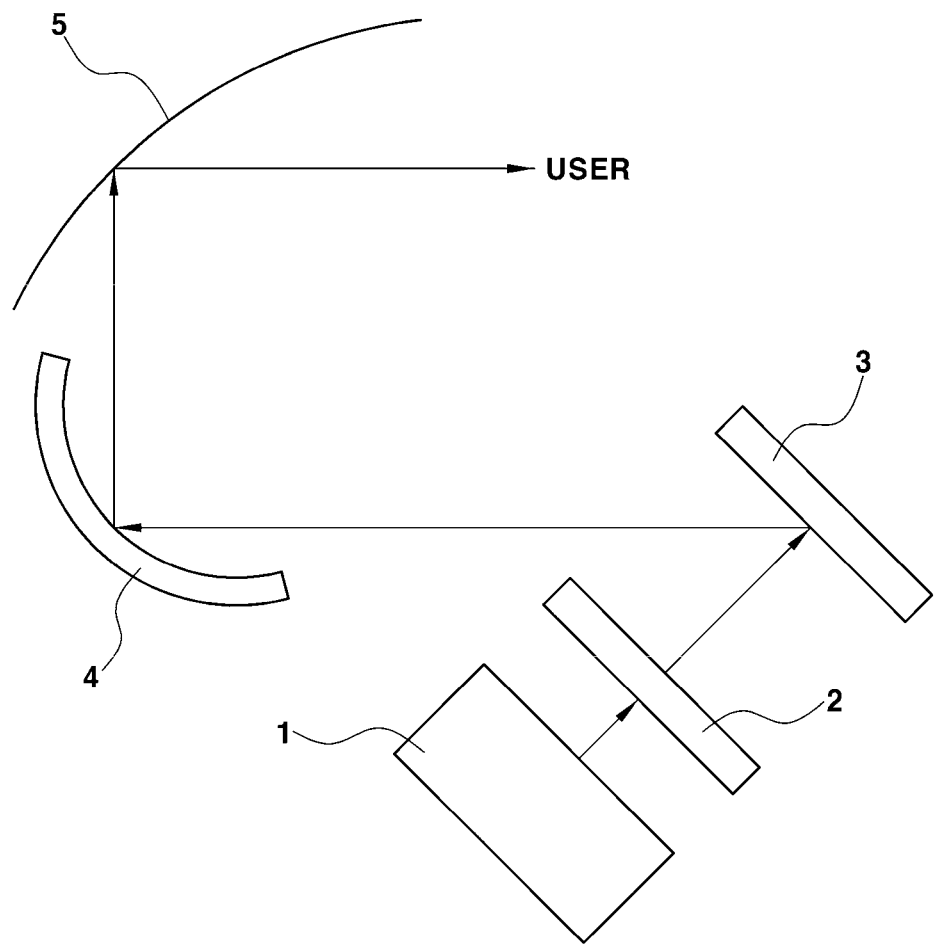
FIG. 1 is a schematic view illustrating the interior of a vehicle including a conventional head-up display.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

In the following description of the embodiments, it will be understood that the suffixes "part", "unit", "module" and the like indicate units for processing at least one function or operation, and may be implemented using hardware, software or a combination of hardware and software.

In addition, in the following description of the embodiments, it will be understood that, when the terms "upper", "lower", etc. are used to describe various elements, these terms are used merely to distinguish the same or similar elements, and are not limited to the sequence thereof.

Moreover, in the following description of the embodiments, the same or corresponding elements are denoted by the same reference numerals even when they are depicted in different drawings, and a detailed description thereof will thus be omitted because it is considered to be unnecessary.

The present disclosure provides a laminated glass 10 configured such that a first glass panel 100 and a second glass panel 200 contact each other, and a high refractive film 300 located between the first glass panel 100 and the second glass panel 200, which are bonded to each other, and configured to refract light incident from a head-up display towards a region in front of a driver. More particularly, the first glass panel 100 may be configured to face the outside of a vehicle, and the second glass panel 200 may be configured to face the interior of the vehicle.

The glass 10 may be any glass located at a position of the vehicle corresponding to the head-up display and, hereinafter, according to one embodiment, the head-up display will be described as being located on a crush pad, and the glass 10 will be described as being a windshield glass configured to output an image towards the front portion of the interior of the vehicle.

The laminated glass 10 may be formed into various laminated types by various methods, and in one embodiment of the present disclosure, bonding films 400 may be configured to have properties of polyvinyl butyral (PVB), or may include all properties which may fix the first glass panel 100 and the second glass panel 200.

Figure 2:
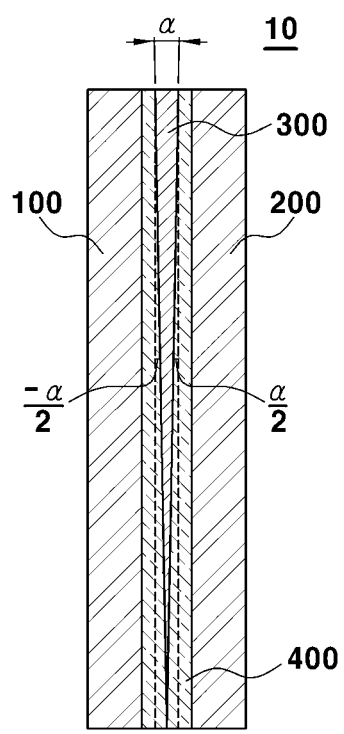
FIG. 2 is a longitudinal-sectional view of a laminated glass according to one embodiment of the present disclosure.

FIG. 2 is a longitudinal-sectional view of the windshield glass 10 for vehicles according to one embodiment of the present disclosure.

The windshield glass 10 for vehicles includes the first glass panel 100 and the second glass panel 200 located on and under the bonding films 400. The first glass panel 100 includes a surface which faces the outside of the vehicle, and the second glass panel 200 includes a surface which faces the interior of the vehicle. The first glass panel 100 and the second glass panel 200 are configured to be located at both sides of the bonding films 400.

Further, the windshield glass 10 for vehicles includes the high refractive film 300 located between the bonding films 400. The respective bonding films 400 may be located on the inner surface of the first glass panel 100 and the inner surface of the second glass panel 200, and the high refractive film 300 configured to have a designated wedge angle may be inserted between the bonding films 400. Otherwise, the bonding films 400 may be located on both surfaces of the high refractive film 300, and the first glass panel 100 and the second glass panel 200 may be located on the respective surfaces of the bonding films 400 opposite the surfaces thereof located on the high refractive film 300.

The bonding films 400 are bonded to both outer surfaces of the high refractive film 300, and are configured to have an angle corresponding to the wedge angle of the high refractive film 300 so that the first glass panel 100 and the second glass panel 200 are parallel to each other. More particularly, when the wedge angle of the high refractive film 300 is $\alpha$ ($\alpha \neq 0$), the bonding films 400 are configured such that the surfaces of the respective bonding films 400, which face the high refractive film 300, are inclined at angles of $-\alpha/2$ and $\alpha/2$, and the other surfaces of the respective bonding films 400, which face the first glass panel 100 and the second glass panel 200, have an angle of 0 in the length direction of the glass 10. In one example, an interface between the high refractive film 300 and the bonding film 400 contacting the first glass panel 100 has an inclined angle, for example, −α/2, with respect to an interface between the first glass panel 100 and the bonding film 400, and an interface between the high refractive film 300 and the bonding film 400 contacting the second glass panel 200 has an inclined angle, for example, α/2, with respect to an interface between the second glass panel 200 and the bonding film 400.

Therefore, the bonding films 400 are configured to surround the high refractive film 300 located therebetween, and the first glass panel 100 and the second glass panel 200 are located on the respective outer surfaces of the bonding films 400 parallel thereto.

The bonding films 400 of the present disclosure may be formed of polyethylene terephthalate (PET), polyethylene (PE), polybutylene terephthalate (PBT), polyvinyl chloride (PVC), polyethylene naphthalate (PEN), ethylene vinyl acetate (EVA), polycarbonate (PC), polyvinyl alcohol (PVA), polypropylene (PP), ionomer (IO), polymethylpentene (PMP), polystyrene (PS), polyvinylidene chloride (PVDC), polymethyl methacrylate (PMMA), ethylene vinyl alcohol (EVA), ethylene-acrylic acid (EAA), ethylene-methyl methacrylate (EMMA), ethylene-methyl acrylate (EMA), ethylene methacrylic acid (EMAA), ethylene-ethyl acrylate (EEA), poly acrylonitrile (PAN), polyphenylene sulfide (PPS), polyphenylene ether (PPE), polyethersulfone (PES), polyetheretherketone (PEEK), polyetherimide (PEI), polyamide-imide (PAI), polyimide (PI), polymer alloys, cellophane, polyamide (PA), nylon, or the like.

More particularly, in one embodiment of the present disclosure, the bonding films 400 may be formed of polyvinyl butyral (PVB).

The high refractive film 300 may be formed to have the wedge angle, as seen in the longitudinal section thereof, and may thus be located at a designated angle so as to remove occurrence of a double image from an image provided by the head-up display. Further, in the present disclosure, the bonding films 400 are formed to have the angle corresponding to the wedge angle of the high refractive film 300, thereby allowing the first glass panel 100 and the second glass panel 200 to be spaced apart from each other by a predetermined distance, for example, a predetermined distance, a same distance, or a constant distance.

As such, the present disclosure may provide the glass 10 in the state in which the first glass panel 100 and the second glass panel 200 are parallel to each other, and the glass 10 may remove stress condensation due to a change in the thickness of the glass 10 so as to secure safety.

The high refractive film 300 may be formed of a material having a refractive index of 1.5 to 1.6, and in one embodiment of the present disclosure, the high refractive film 300 may be formed of at least one of ionomer, polyurethane, thermoplastic polyurethane or combinations thereof. More particularly, the high refractive film 300 may be formed of a material having a refractive index of 1.58 to 1.62. The high refractive film 300 may have a refractive index higher than that of bonding films 400 and that of the first and second glass panel 100 and 200.

The high refractive film 300 may be configured to have a wedge angle of 0.0028 rad to 0.0042 rad in the length direction of the glass 10, and in more detail, may be configured such that the sum of angles of both symmetrical surfaces of the high refractive film 300 from a vertical central line of the glass 10 is 0.0028 rad to 0.0042 rad.

In summary, the high refractive film 300 may be configured to have an angle of 0.0014 rad to 0.0021 rad in one direction from the vertical central line of the glass 10, so that both surfaces of the high refractive film 300 in the length direction have the corresponding angle. Further, the glass 10, in which the first glass panel 100 and the second glass panel 200 are parallel to each other by the bonding films 400 formed to have a shape corresponding to the angle of both surfaces of the high refractive film 300 is provided.

Figure 3A:
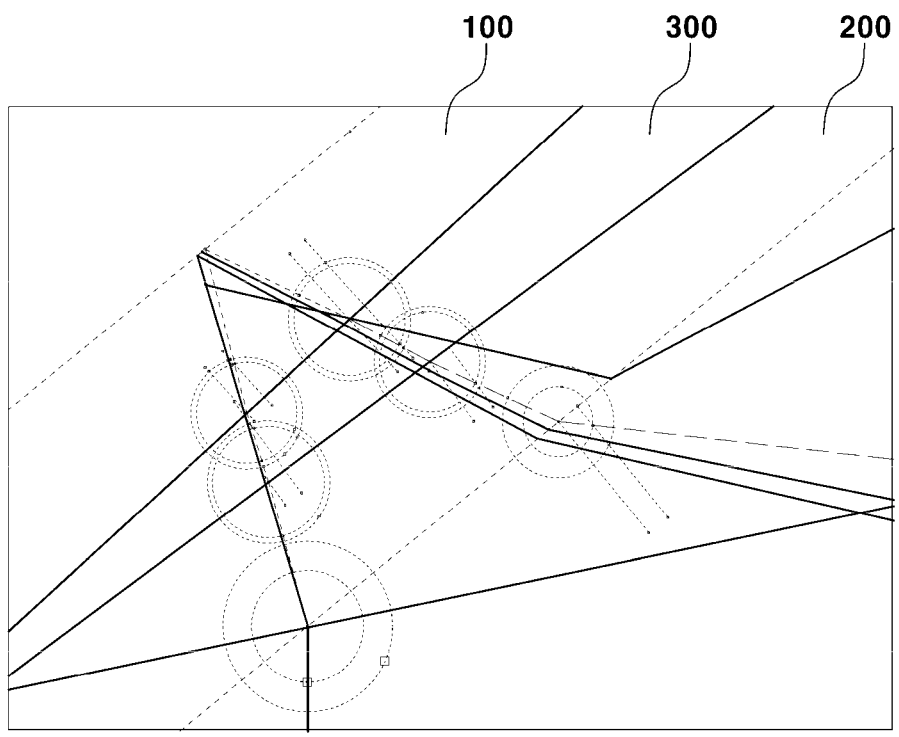
FIG. 3a is a view illustrating a path of light entering from a head-up display, which is refracted by the glass according to one embodiment of the present disclosure.
Figure 3B:
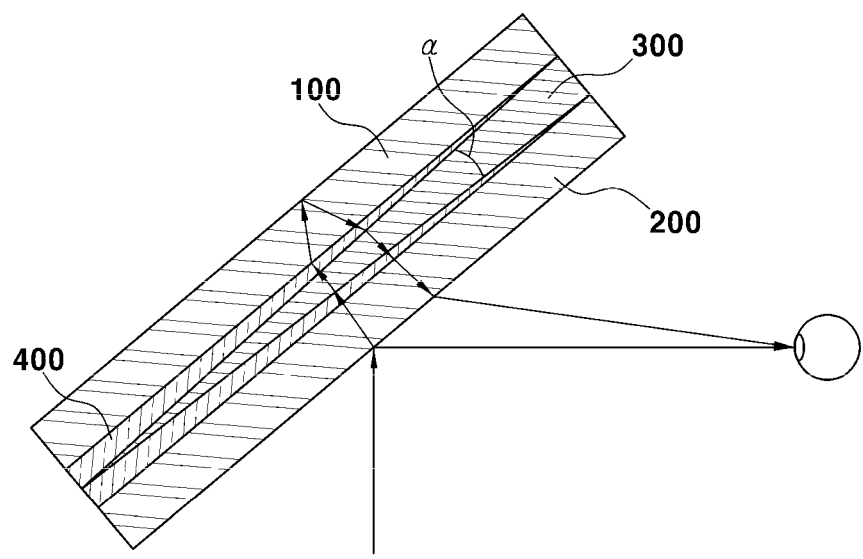
FIG. 3b is a view illustrating the path of light entering from the head-up display, which is refracted by the glass according to one embodiment of the present disclosure, inside a vehicle.

FIGS. 3a and 3b illustrate an optical path of an image projected by the head-up display, which is refracted inside the glass 10.

According to one embodiment of the present disclosure, light entering from the head-up display is incident upon the glass 10 at an incident angle of 2.8 to 4.2 mrad, and some of the light is reflected by the outer surface of the second glass panel 200 and the remainder of the light is refracted thereby. Further, the light refracted at a designated angle by the outer surface of the second glass panel 200, shown on the left side in these figures, moves along the bonding film 400 and passes through the high refractive film 300.

When the light passes through the high refractive film 300, the light is refracted leftwards in these figures (towards the outside of the vehicle), and then moves again along the bonding film 400 and is refracted by the surface of the first glass panel 100 opposite the bonding film 400 in the height direction (upwards in these figures).

The light reaching the outer surface of the first glass panel 100, i.e., the outermost surface of the glass 10, is totally reflected by the outer surface of the first glass panel 100, and the totally reflected light is refracted by the high refractive film 300 and thus moves to the second glass panel 200. The light entering the second glass panel 200 is refracted into the air and comes into the user's field of view.

Because the degree of refraction of the refracted light passing through the high refractive film 300 is determined by the refractive index of the high refractive film 300, the light primarily reflected by the second glass panel 200 and the light refracted by the outer surface of the first glass panel 100, i.e., the outermost surface of the glass 10, are radiated to a region corresponding to the user's field of view.

That is, the high refractive film 300 according to the present disclosure is configured to have a wedge angle, as seen in the longitudinal section thereof, and the wedge angle allows light, which enters the interior of the vehicle through the second glass 200, and light, which enters the interior of the vehicle through total reflection by the first glass panel 100, to be radiated to the user's field of view through the high refractive film 300, thereby enabling the image from the head-up display to be displayed without occurrence of a double image. As such, even though the glass 10 according to the present disclosure includes the first glass panel 100 and the second glass panel 200, which are spaced apart from each other by a regular distance, the double image formed in the user's field of view may be removed through the use of the high refractive film 300 having the wedge angle.

Figure 4A:
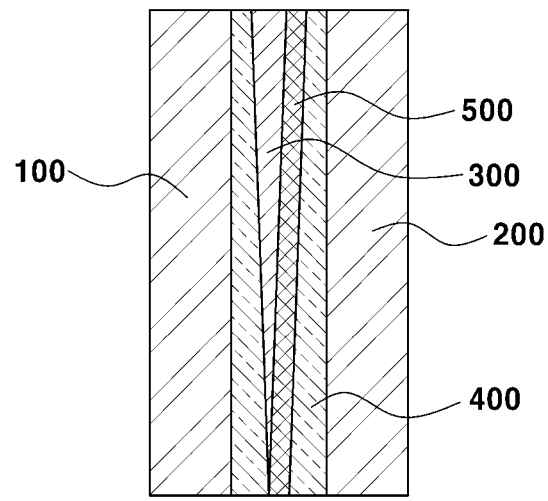
FIG. 4a is a longitudinal-sectional view of a glass including a sound insulating film according to one embodiment of the present disclosure.

FIG. 4a is a longitudinal-sectional view of a glass including a sound insulating film 500 according to one embodiment of the present disclosure.

Bonding films 400 are located on both outer surfaces of a high refractive film 300 having a wedge angle, and then a first glass panel 100 and a second glass panel 200 are located on the outer surfaces of the bonding films 400. More particularly, the sound insulating film 500 may be further located between one bonding film 400 and the high refractive film 300.

The sound insulating film 500 may include one or more layers including a polyvinyl acetal resin and a plasticizer, and the respective layers may be configured to have different mechanical strengths. Further, the sound insulating film 500 including a plurality of layers may be configured to have different weight-average molecular weights, thereby improving penetration resistance, mechanical strength and sound insulation performance.

As shown in this figure, the sound insulating film 500 according to one embodiment of the present disclosure is configured to be located between the high refractive film 300 and the bonding film 400 throughout the overall length of the glass 10.

Figure 4B:
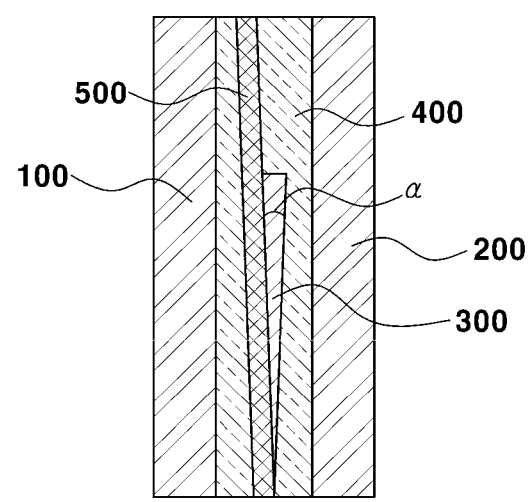
FIG. 4b is a longitudinal-sectional view of a glass in which a high refractive film is located within a part of the glass according to another embodiment of the present disclosure.

FIG. 4b illustrates a glass 10 according to another embodiment of the present disclosure, and in this case, a high refractive film 300 having a wedge angle may be configured to be located on at least a part of the overall length of the glass 10, and a sound insulating film 500 may extend along the high refractive film 300 so as to be located on the overall length of the glass 10.

The sound insulating film 500 located so as to come into contact with the high refractive film 300 is configured to extend in the length direction of the glass 10 while maintaining the same angle as the wedge angle of the high refractive film 300.

Figure 4C:
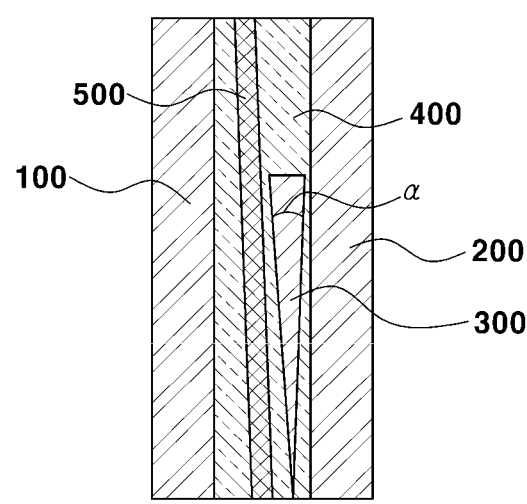
FIG. 4c is a longitudinal-sectional view of a glass in which a sound insulating film is located parallel to the glass according to yet another embodiment of the present disclosure.

In contrast, FIG. 4c illustrates a glass 10 according to yet another embodiment of the present disclosure, in which a high refractive film 300 is located on at least a part of the overall length of the glass 10, and a sound insulating film 500 is located adjacent to the high refractive film 300.

The sound insulating film 500 is formed at a position adjacent to the high refractive film 300 and is located on a bonding film 400, and thus, the sound insulating film 500 may be configured to extend parallel to the glass 10.

The high refractive film 300 may be located in a part of the glass 10 in a region, to which light projected by the head-up display is applied, and the sound insulating film 500 may be located adjacent to the high refractive film 300 or a part of the sound insulating film 500 may come into contact the high refractive film 300. The sound insulating film 500 may extend parallel to the length direction of the glass 10.

As is apparent from the above description, the present disclosure provides the following effects through the above-described configuration and connection and usage relations.

The present disclosure provides a glass for vehicles which includes a first glass panel and a second glass panel having shapes substantially parallel to each other so as to secure safety against damage.

Further, the present disclosure provides a glass for vehicles into which a high refractive film is inserted so as to mitigate user fatigue in the field of view thereof.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents. That is, while the disclosure has been explained in relation to embodiments thereof, it is to be understood that various modifications thereof will become apparent to those skilled in the art upon reading the specification. These embodiments have been described to explain the best mode to implement the technical scope of the disclosure, and various modifications required in the specific application and purpose of the present disclosure are possible. Therefore, the above detailed description of the present disclosure is not intended to limit the disclosure. Further, it must be interpreted that the accompanying claims encompass other modes.

What is claimed is:

1. A glass for vehicles, comprising:
   a first glass panel;
   a second glass panel spaced apart from the first glass panel while maintaining a predetermined distance from the first glass panel;
   bonding films located between the first glass panel and the second glass panel; and
   a high refractive film located between the bonding films,
   wherein a wedge angle a is located between the bonding films, and the bonding films facing the high refractive film are inclined at angles of $-\alpha/2$ and $\alpha/2$, respectively,
   wherein the high refractive film is configured to have the wedge angle of 0.0028 rad to 0.0042 rad in a longitudinal section thereof, and
   wherein the first glass panel and the second glass panel are located on respective outer surfaces of the bonding films parallel thereto.

2. The glass for vehicles of claim 1, wherein one surface of the first glass panel and one surface of the second glass panel maintain the same distance therebetween.

3. The glass for vehicles of claim 1, wherein the high refractive film is configured to have a refractive index of 1.58 to 1.62.

4. The glass for vehicles of claim 3, wherein the high refractive film includes at least one of ionomer, polyurethane, thermoplastic polyurethane or combinations thereof.

5. The glass for vehicles of claim 1, wherein the high refractive film is configured to be located in at least a portion of a space between the first glass panel and the second glass panel.

6. The glass for vehicles of claim 1, further comprising a sound insulating film located between the high refractive film and one of the bonding films.

7. The glass for vehicles of claim 6, wherein the sound insulating film extends along the first glass panel or the second glass panel.

8. The glass for vehicles of claim 6, wherein the sound insulating film is in contact with the high refractive film.

9. The glass for vehicles of claim 6, wherein the sound insulating film is located parallel to an exterior surface of the glass for vehicles.

10. The glass for vehicles of claim 1, wherein the bonding films include polyvinyl butyral (PVB).

11. A glass for vehicles, comprising:
    a first glass panel;
    a second glass panel spaced apart from the first glass panel while maintaining a constant distance from the first glass panel;
    a first bonding film and a second disposed between the first glass panel and the second glass panel; and
    a high refractive film disposed between the first bonding film and the second bonding film,
    wherein a wedge angle a is located between the first bonding and the second bonding film, and the first bonding film and the second bonding film facing the high refractive film are inclined at angles of $-\alpha/2$ and $\alpha/2$, respectively,
    wherein the first bonding film is in direct contact with the first glass panel and the high refractive film, and the second bonding film is in direct contact with the second glass panel and the high refractive film, and
    wherein the first glass panel and the second glass panel are located on respective outer surfaces of the first and second bonding films parallel thereto.

12. The glass for vehicles of claim 11, wherein the high refractive film is configured to have a refractive index of 1.58 to 1.62.

13. The glass for vehicles of claim 11, wherein the high refractive film includes at least one of ionomer, polyurethane, thermoplastic polyurethane or combinations thereof.

14. The glass for vehicles of claim 11, wherein the first bonding film and the second bonding film include polyvinyl butyral (PVB).

15. A glass for vehicles, comprising:
a first glass panel;
a second glass panel spaced apart from the first glass panel while maintaining a constant distance from the first glass panel;
a first bonding film and a second disposed between the first glass panel and the second glass panel;
a high refractive film disposed between the first bonding film and the second bonding film; and
a sound insulating film disposed between the high refractive film and the second bonding film,
wherein a wedge angle a is located between the first bonding and the second bonding film, and the first bonding film and the second bonding film facing the high refractive film are inclined at angles of $-\alpha/2$ and $\alpha/2$, respectively, and
wherein the first bonding film is in direct contact with the first glass panel and the high refractive film, and the second bonding film is in direct contact with the second glass panel and the sound insulating film, and
wherein the first glass panel and the second glass panel are located on respective outer surfaces of the first and second bonding films parallel thereto.

16. The glass for vehicles of claim 15, wherein the high refractive film is configured to have a refractive index of 1.58 to 1.62.

17. The glass for vehicles of claim 15, wherein the high refractive film includes at least one of ionomer, polyurethane, thermoplastic polyurethane or combinations thereof.

18. The glass for vehicles of claim 15, wherein the first bonding film and the second bonding film include polyvinyl butyral (PVB).

19. The glass for vehicles of claim 15, wherein the sound insulating film is located parallel to an exterior surface of the glass for vehicles.

* * * * *